(12) United States Patent  (10) Patent No.: US 8,116,017 B2
Drozdowicz  (45) Date of Patent: Feb. 14, 2012

(54) REDUCED VIBRATION OPTICAL SYSTEM WITH INEXPENSIVE PRECISION POSITIONING ASSEMBLY

(75) Inventor: Zbigniew Drozdowicz, Orange, CT (US)

(73) Assignee: Abet Technologies, Inc., Milford, CT (US)

( * ) Notice: Subject to any disclaimer, the term of this patent is extended or adjusted under 35 U.S.C. 154(b) by 1674 days.

(21) Appl. No.: 11/375,274

(22) Filed: Mar. 14, 2006

(65) Prior Publication Data

US 2007/0217201 A1 Sep. 20, 2007

(51) Int. Cl.
G02B 7/02 (2006.01)
G02B 15/14 (2006.01)
(52) U.S. Cl. .......... 359/822; 359/819; 359/696
(58) Field of Classification Search .......... 359/694–700, 359/819–829
See application file for complete search history.

(56) References Cited

U.S. PATENT DOCUMENTS

| | | | |
|---|---|---|---|
| 3,407,018 A | 10/1968 | Miller | 350/321 |
| 3,436,050 A | 4/1969 | Tibbals, Jr. | 248/487 |
| 3,596,863 A | 8/1971 | Kaspareck | 248/278 |
| 3,989,358 A * | 11/1976 | Melmoth | 359/813 |
| 4,139,948 A | 2/1979 | Tsuchiya et al. | 33/180 |
| 4,147,405 A | 4/1979 | Spainhour | 350/96.21 |
| 4,331,384 A | 5/1982 | Eisler | 350/321 |
| 4,691,586 A | 9/1987 | van Leijenhorst et al. | 74/479 |
| 4,712,444 A | 12/1987 | Lewis | 74/479 |
| 4,767,188 A * | 8/1988 | Myer | 359/503 |
| 4,840,450 A | 6/1989 | Jones et al. | 350/96.2 |
| 4,869,583 A | 9/1989 | Tiedje | 350/636 |
| 5,136,433 A * | 8/1992 | Durell | 359/829 |
| 5,165,297 A | 11/1992 | Krueger | 74/479 |
| 6,443,608 B1 | 9/2002 | Storck et al. | 362/523 |
| 6,467,762 B1 | 10/2002 | Davies | 269/71 |
| 6,571,041 B2 * | 5/2003 | Bourcier et al. | 385/52 |
| 2004/0213005 A1 | 10/2004 | Kohlmeier-Beckmann et al. | 362/471 |

* cited by examiner

Primary Examiner — Mohammed Hasan
(74) Attorney, Agent, or Firm — St. Onge Steward Johnston & Reens LLC

(57) ABSTRACT

An optical system with precision positioning of optical devices is disclosed generally comprising an optical device and a carrier for the optical device, where the carrier has substantially parallel first and second pivot axes and a third pivot axis that is substantially orthogonal to the first and second pivot axes that allows the optical device to be moved in three substantially orthogonal directions. In certain embodiments, the pivot axes are formed from hinges, which may be spring loaded or biased by a tensioning element running approximately forty five degrees to all three pivot axes. In some embodiments, the carrier is supported at least partly independently from an outer housing in order to insulate it from vibrations caused by vibrating devices mounted to the housing.

31 Claims, 12 Drawing Sheets

REDUCED VIBRATION OPTICAL SYSTEM WITH INEXPENSIVE PRECISION POSITIONING ASSEMBLY

FIELD OF THE INVENTION

The present invention relates to an optical system with the ability to precisely position an optical device, such as a radiation source. More specifically, the invention relates to a system that permits precise movement in three directions using inexpensive components and minimization of device vibration.

BACKGROUND OF THE INVENTION

Optical systems with positionable optical devices, such as light sources, are generally well known. These devices, which have a wide variety of uses, typically include an optical device that serves as a source of radiation, such as an arc lamp. The proper performance of such optical systems depends, in large part, on the accurate positioning of the various optical devices of the system, such as, for example, the lamp that supplies the radiation, and a focal lens, which focuses and transmits this radiation to an object to be illuminated or otherwise receives the radiation, as well as any other desired optical components, such as mirrors or condensers.

Accordingly, mechanisms for positioning at least one optical device relative to another have long been employed in such systems, such as, for example, those disclosed in U.S. Pat. No. 3,436,050 to Tibbals, U.S. Pat. No. 4,712,444 to Lewis, and U.S. Pat. No. 5,136,433 to Durell. Typically, such mechanisms include the ability to adjust the horizontal and vertical orientation of an optical device. However, these designs generally only permit adjustments in these two axes (i.e., the X and Y axes). Therefore, while these arrangements allow the user to obtain a particular alignment between optical devices, they do not permit adjustment of the distance between them, which would otherwise provide a focusing movement generally important in optical systems.

Accordingly, it has been suggested to use a positioning device that is able to move an optical device in three orthogonal directions, such as the design described in U.S. Pat. No. 4,840,450 to Jones et al. This type of system allows the position of an optical device to be manually adjusted along the X, Y, and Z axes using three mutually orthogonal adjustment rods. However, these known systems have a number of disadvantages, including arrangements that involve multiple, complex parts, which are typically expensive and difficult to manufacture, such as the assembly of micropositioning devices described in the '450 patent, as well as the undesirable effect that repositioning along one axis has on the adjustments that have been made along the other axes.

Additionally, another problem with such systems is that often, it is advantageous to have a device such as a cooling fan as part of the system, particular when dealing with radiation generating devices and their power supplies. However, this fan, which is typically mounted to whatever housing houses the optical system, generates undesirable vibrations. As a result, the various parts of the system, including the optical devices and the positioning devices therefor, likewise experience this vibration. This vibration of the optical devices can cause slight misalignments during use of the system, and vibration of the positioning device during adjustment can result in imprecise alignment of these optical devices in the first place.

What is desired, therefore, is optical system that allows efficient adjustment of the optical devices in three orthogonal directions. What is further desired is a system that reduces the amount of vibrations experienced by the system. What is also desired is a system that achieves the above objectives that can be manufactured with simple, inexpensive parts.

SUMMARY OF THE INVENTION

Accordingly, it is an object of the present invention to provide an optical system that allows adjustment of an optical element in three approximately orthogonal directions.

It is a further object of the present invention to provide an optical system where adjustment along one axis minimally impacts adjustments made along the other axes.

It is yet another object of the present invention to provide an optical system that attenuates the vibrations caused by vibrating devices in the system.

It is still another object of the present invention to provide an optical system the enables adjustments in three orthogonal directions using a minimal amount of inexpensive, simple parts.

In order to overcome the deficiencies of the prior art and to achieve at least some of the objects and advantages listed, the invention comprises an optical system, including an optical device, a carrier for the optical device, the carrier including substantially parallel first and second pivot axes and a third pivot axis substantially orthogonal to the first and second pivot axes for moving the optical device in three substantially orthogonal directions.

In another embodiment, the invention comprises an optical system, including a housing, an optical device, and a carrier for the optical device disposed in the housing, wherein the carrier includes at least one support element for supporting the carrier at least partially independently of the housing to at least partially insulate the carrier from vibrations of the housing, and wherein the carrier includes substantially parallel first and second pivot axes and a third pivot axis substantially orthogonal to the first and second pivot axes for moving the radiation source in three substantially orthogonal directions.

In yet another embodiment, the invention comprises an optical system, including a housing, a carrier for an optical device disposed in the housing, wherein the carrier includes at least one support element for supporting the carrier at least partially independently of the housing to at least partially insulate the optical device from vibrations of the housing. In some of these embodiments, the housing includes at least one hole through which a portion of the carrier passes to support the carrier at least partially independently of the housing.

In some of these embodiments, the optical device is a source of radiation, which in some cases, is a lamp, such as an arc lamp, a halogen lamp, or a deuterium lamp.

In certain embodiments, the system further includes a housing, in which the carrier is disposed, a stationary base member disposed in the housing, and a focal lens for receiving and transmitting radiation from the source, where the focal lens is fixedly mounted in the base member such that pivoting about the first, second, and third pivot axes moves the source relative to the focal lens.

In some of these embodiments, the housing includes at least one main damping member for supporting the housing on a surface, and the at least one support element for supporting the carrier includes at least one ancillary damping member. In certain embodiments, the vibration-causing device is a cooling fan.

In some of these embodiments, the damping members are simple rubber feet providing acoustical impedance mismatch between the housing or optical device and the support surface.

In some embodiments, the system further includes an optical element mount secured to the carrier and movable relative to the source of radiation. In some of these embodiments, at least one actuator moves the optical element mount relative to the source of radiation, and in some embodiments, there are at least three actuators, where the rotation of the actuators moves the optical element mount relative to the carrier. In some embodiments, an optical element, such as a condenser, is secured to the optical element mount.

In certain embodiments, the system further includes first, second, and third hinges that form the first, second, and third pivot axes. In some of these embodiments, the first, second, and third hinges are spring loaded, while in some embodiments, a system includes a tensioning element, such as a spring, having a first end connected to a stationary base member and a second end connected to the carrier such that the tensioning element biases the first, second, and third hinges. In some cases, the tensioning element extends approximately forty fives degrees relative to each of the first, second, and third pivot axes.

In certain embodiments, the carrier includes a first portion connected to the base member by the first hinge, a second portion connected to the first portion by the second hinge, and a third portion connected to the second portion by the third hinge. In some of these embodiments, a first actuator causes the first portion of the carrier to pivot about the first pivot axis, a second actuator causes the second portion of the carrier to pivot about the second pivot axis, and a third actuator that causes the third portion of the carrier to pivot about the third pivot axis. In certain cases, the first, second, and third actuators comprise first, second, and third turn screws. In some of these embodiments, the first turn screw engages the base member, the second turn screw engages the second portion of the carrier, and the third turn screw engages the third portion of the carrier.

In some embodiments, the system further includes a bracket to which the optical device is mounted and a swivel by which the bracket is connected to the carrier.

DETAILED DESCRIPTION OF THE INVENTION

Figure 1:
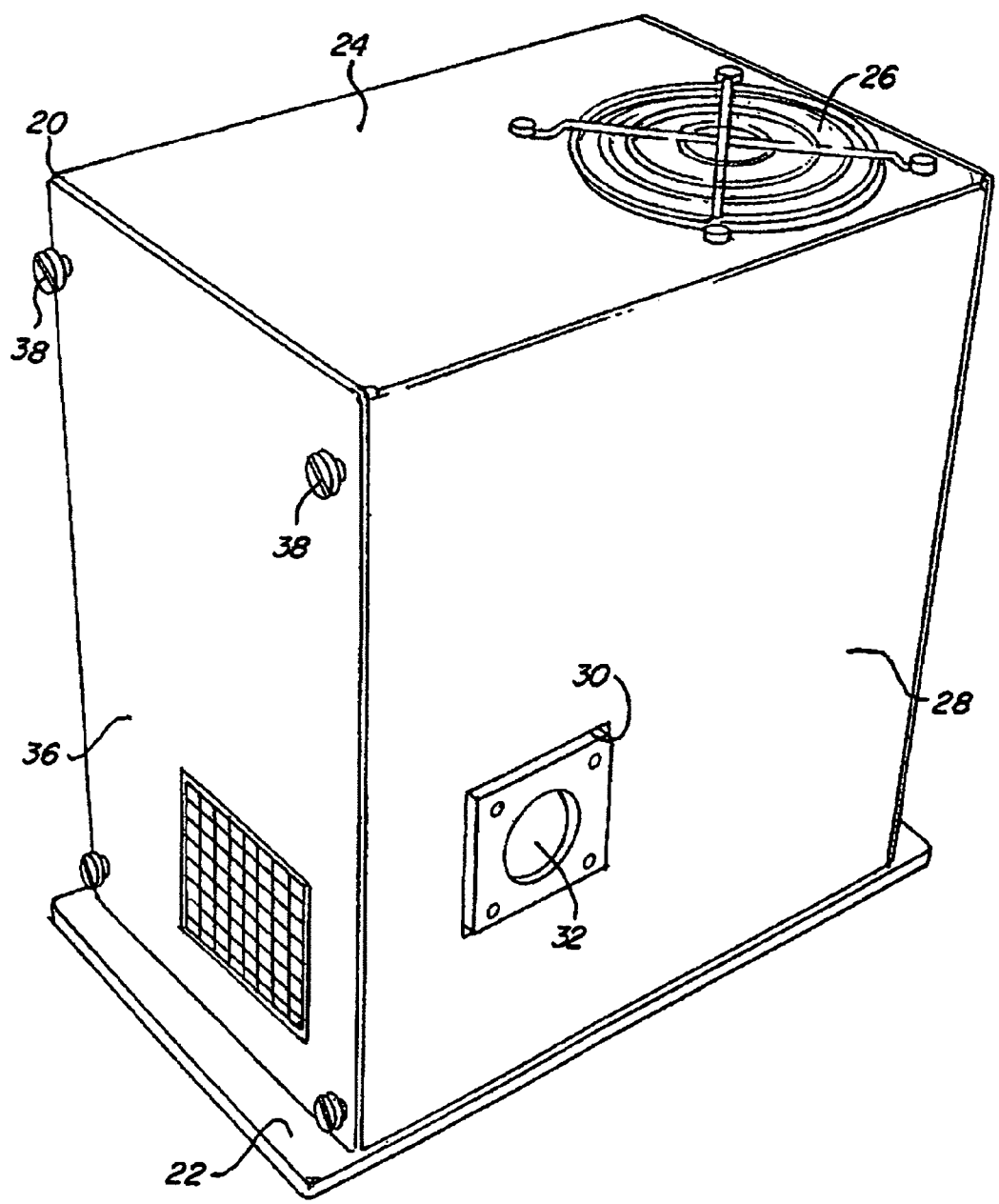
FIG. 1 is a perspective, side view of an optical system in accordance with the invention.

The basic components of one embodiment of an optical system in accordance with the invention are illustrated in FIGS. 1-4. As used in the description, the terms "top," "bottom," "above," "below," "over," "under," "above," "beneath," "on top," "underneath," "up," "down," "upper," "lower," "front," "rear," "back," "forward" and "backward" refer to the objects referenced when in the orientation illustrated in the drawings, which orientation is not necessary for achieving the objects of the invention.

Figure 2:
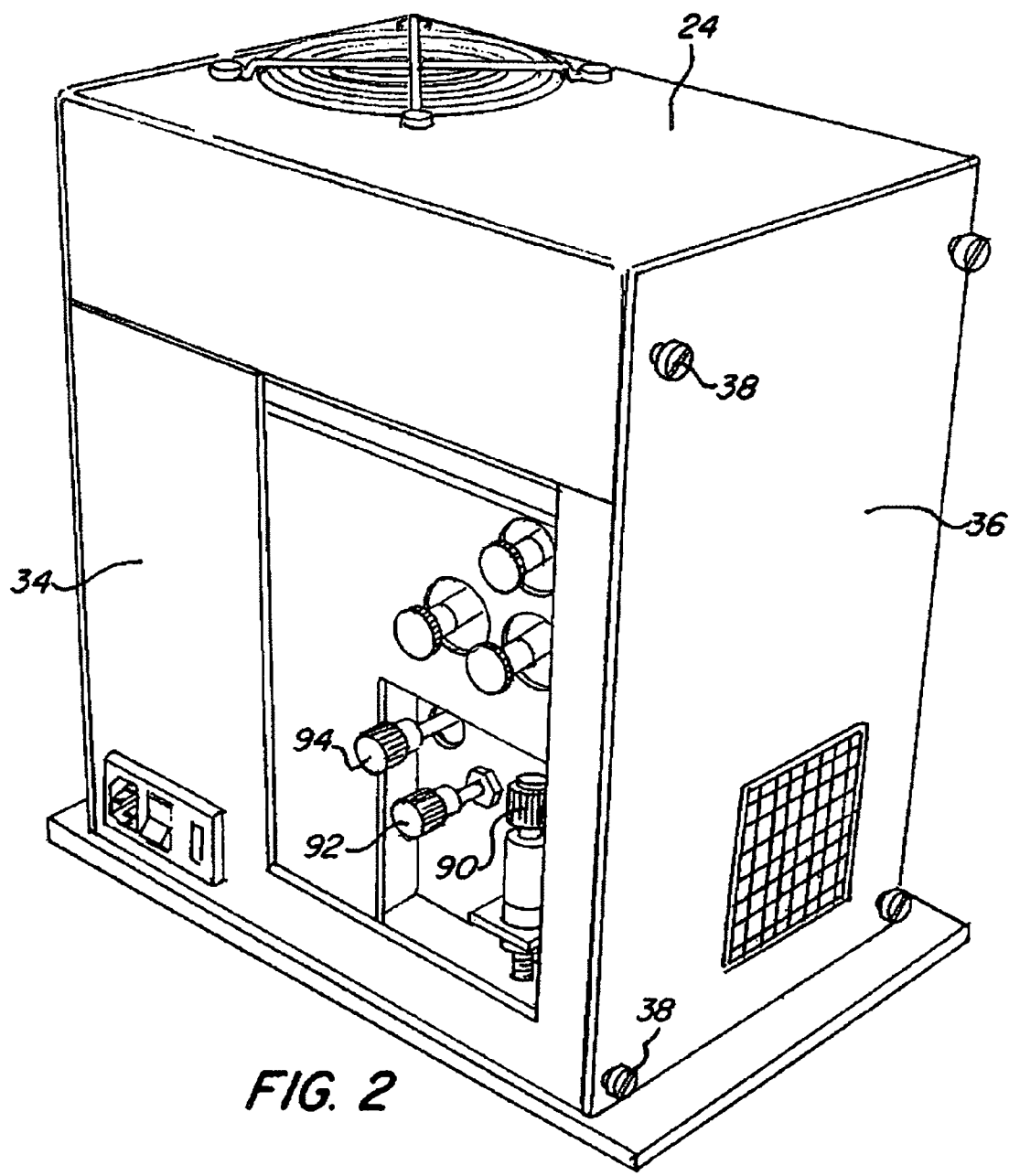
FIG. 2 is another perspective, side view of the optical system of FIG. 1.

Referring first to FIGS. 1-2, the exterior of the optical system is shown. An outer housing 20, which is essentially a metal box, has a bottom portion 22, which is slightly larger than the rest of the housing 20 for securely positioning the device on the surface where it will be used, and a top portion 24, which includes an air opening 26 for a cooling fan, as is further described below. A first side 28 of the housing 20 includes an opening 30 to allow light egress from an optical element, such as a focal lens 32. A second side 34 provides access to a variety of controls for the internal mechanisms of the system, as further explained below. A removable panel 36 is secured to the rest of the housing 20, such as by a set of small screws 38, so that one can easily gain access to the inside of the housing 20.

Figure 3:
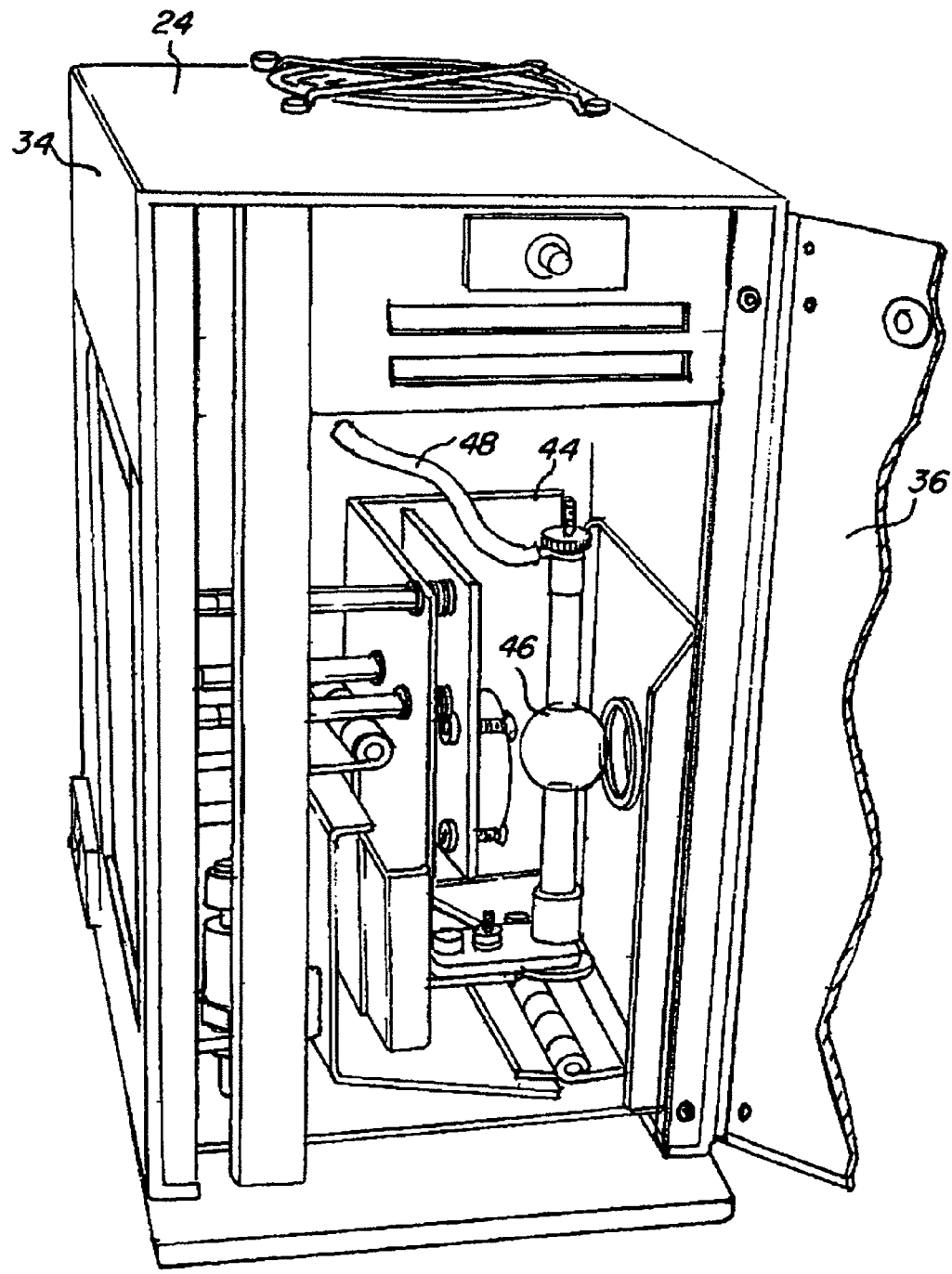
FIG. 3 is a perspective, exposed front view of the optical system of FIGS. 1-2.
Figure 4:
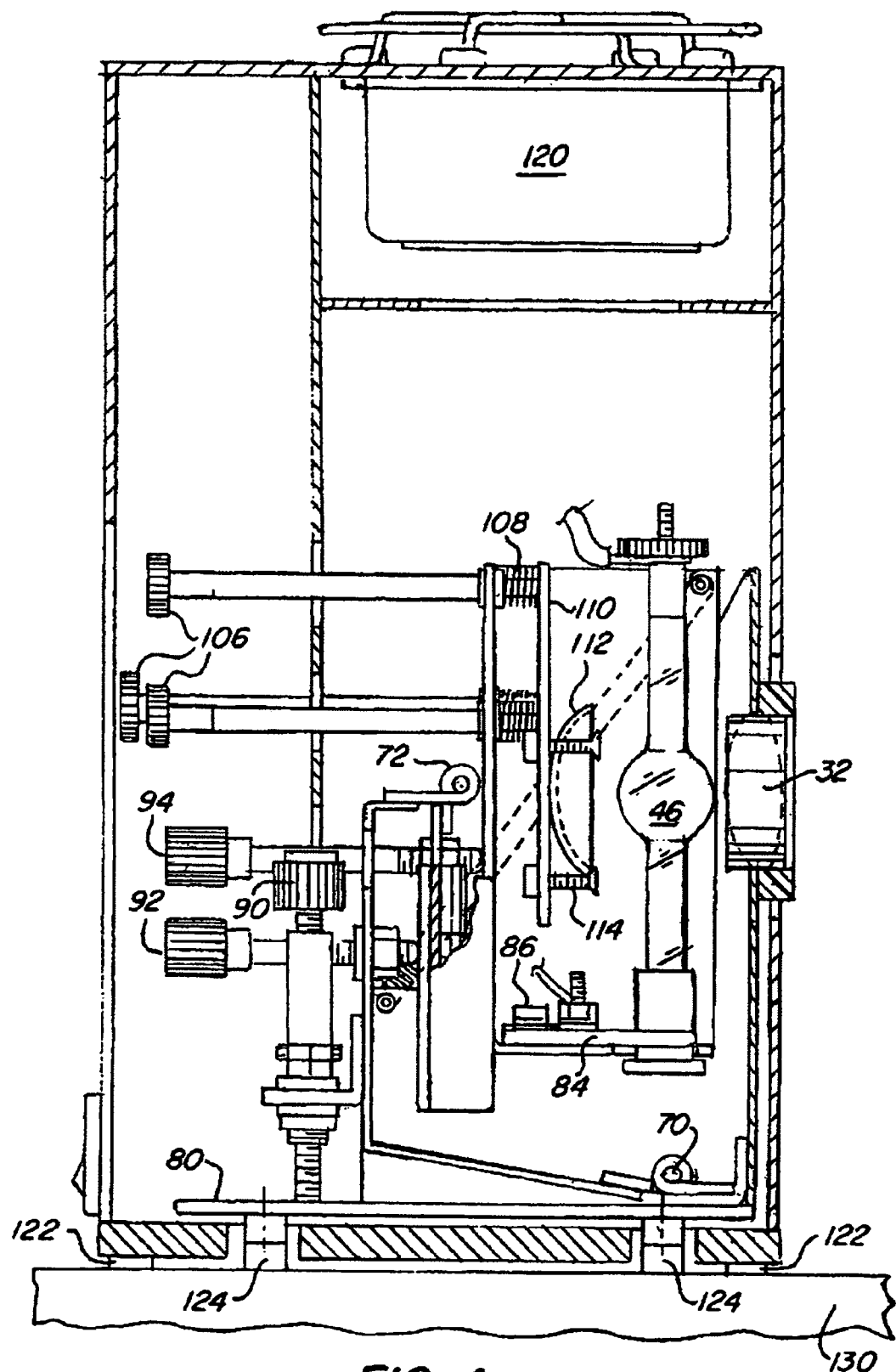
FIG. 4 is a partially cross-sectional, front view of the optical system of FIG. 3.
Figure 5:
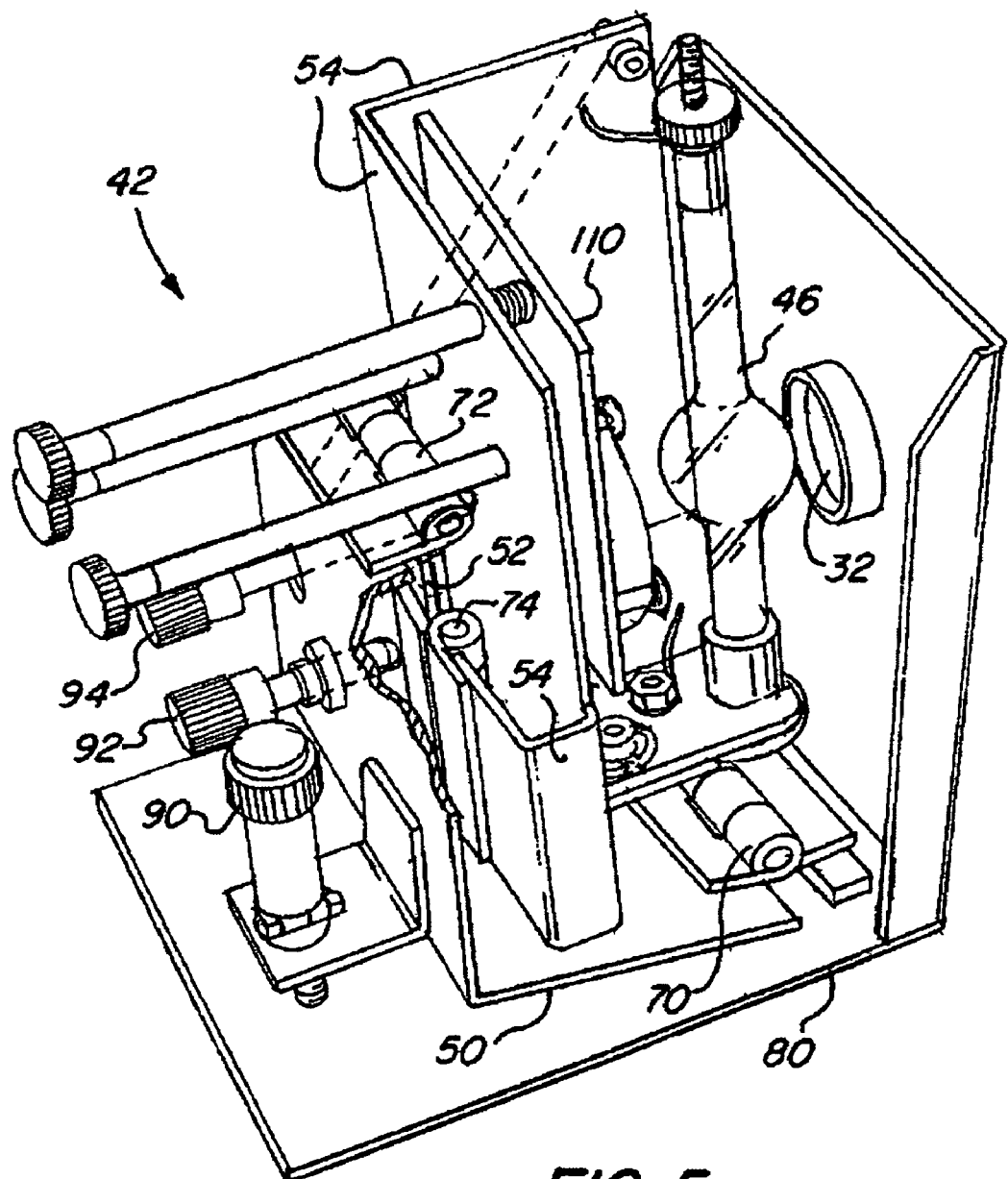
FIG. 5 is a front perspective view of the positioning assembly of the system of FIG. 3.
Figure 6:
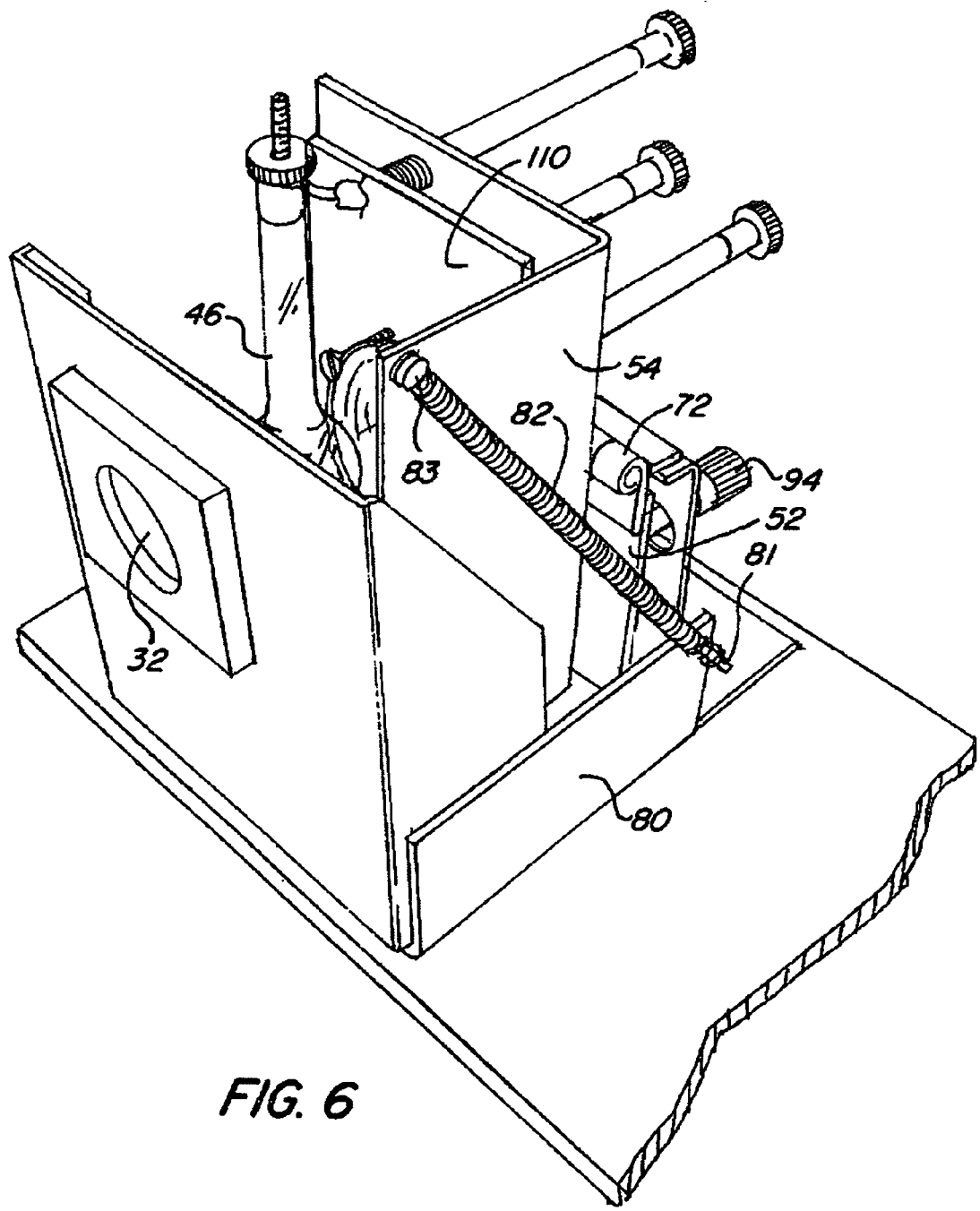
FIG. 6 is a rear perspective view of the positioning assembly of FIG. 5.

The interior of the housing 20, shown in FIGS. 3 and 4, includes at least one optical device 46 and a positioning assembly 42 therefor. The positioning assembly 42, without the outer housing 20, is illustrated in FIGS. 5-6. The main part of the assembly is a carrier 44, which carries an optical device, such as a source of radiation 46 powered via a cable 48. The source 46 is typically a device that generates light, such as an arc lamp, a deuterium lamp, or a tungsten halogen lamp, or some other source with a radiating element of a similar scale (i.e., 0.004" to 0.5").

In certain advantageous embodiments, the carrier 44 includes first, second, and third portions 50, 52, 54, which pivot about first, second, and third pivots axes 60, 62, 64, respectively (as is further explained with reference to FIGS. 7-9 below). The first and second pivot axes 60, 62 are substantially parallel, and the third pivot axis 64 is substantially orthogonal to the first and second axes 60, 62. The pivot axes 60, 62, 64 are formed by hinges 70, 72, 74, respectively, which hingedly connect the various portions of the assembly 42.

More specifically, in the advantageous embodiment illustrated, the assembly 42 also includes a base portion 80, which remains stationary within and is mechanically separated from the housing 20. The first hinge 70 connects the first carrier portion 50 to the base portion 80, such that the first carrier portion 50 is pivotable relative to the base portion 80. The second hinge 72 connects the much smaller second carrier portion 52 to the larger first carrier portion 50. The third hinge 74, in turn, connects the second carrier portion 52 to the much larger third carrier portion 54. The radiation source 46 is secured to the third carrier portion 54, and thus, is affected by pivoting motion about all three hinges 70, 72, 74. In this way, by pivoting the various portions of the carrier about the pivot axes 60, 62, 64, one is able to move the radiation source 46, in three approximately orthogonal directions, and thus, can precisely position the source 46 relative to the focal lens 32.

In certain advantageous embodiments, the hinges 70, 72, 74 are standard, off-the-shelf hinges that are attached to the various portions of the assembly 42 by screws, rivets, spot welding, or the like. However, it should be noted that, in some embodiments, these hinges can be integrally formed portions of the sheet metal used to fabricate the various portions of the positioning assembly 42.

The assembly 42 also includes a plurality of actuators 90, 92, 94 for causing the carrier portions 50, 52, 54 to pivot about the axes 60, 62, 64, respectively. In certain advantageous embodiments, these actuators may by turn screws, with a knob at one end to facilitate easy turning by the user and a rounded or rolling tip for engaging the relevant surface of the assembly 42.

Figure 7:
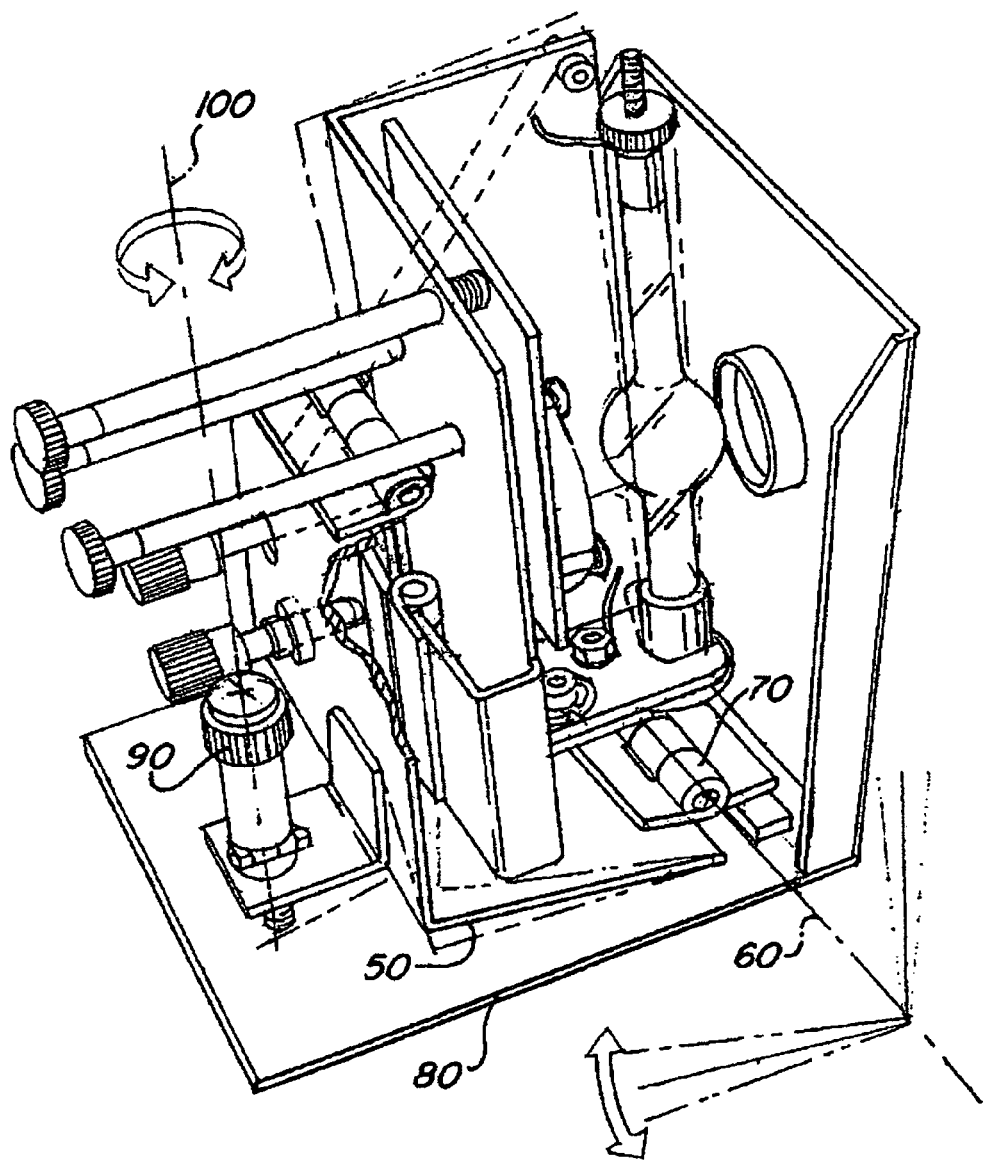
FIG. 7 is a perspective view showing additional detail of the operation of the assembly of FIG. 5.
Figure 8:
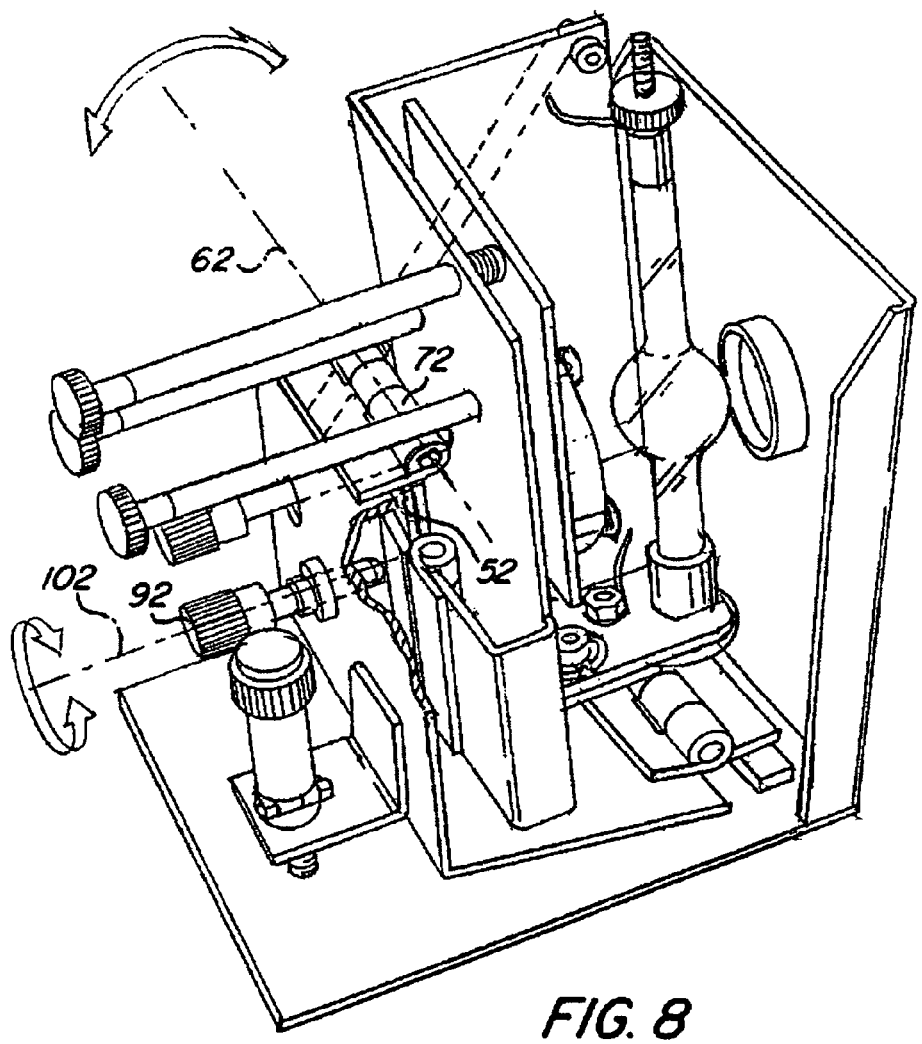
FIG. 8 is a perspective view showing additional detail of the operation of the assembly of FIG. 5.
Figure 9:
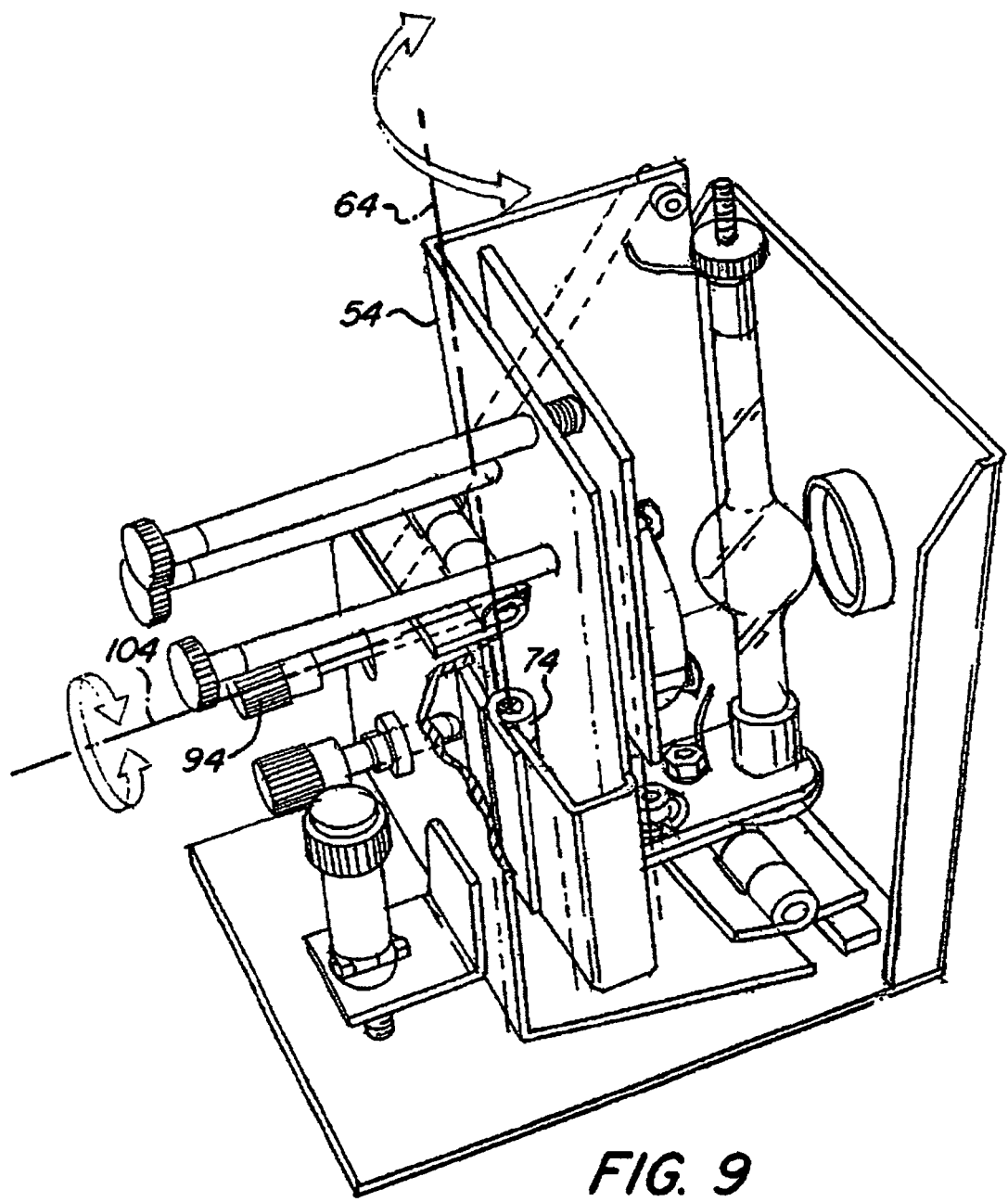
FIG. 9 is a perspective view showing additional detail of the operation of the assembly of FIG. 5.

The operation of these actuators is illustrated in FIGS. 7-9. Referring first to FIG. 7, the first screw 90, which is connected to the first portion 50 of the carrier, is rotated about a first rotational axis 100. Because the bottom, rounded portion of the screw 90 abuts the surface of the base member 80, the turning of screw 90 forces the first portion 50 to pivot relative to the base member 80 about the pivot axis 60. In this way, the radiation source 46 is moved closer to and farther away from the focal lens 32, depending on whether the screw 90 is rotated clockwise or counterclockwise, thereby providing the user with a focusing motion (i.e., along the Z-axis).

Referring now to FIG. 8, the second screw 92, which is secured to the first carrier portion 50 and a tip that abuts the second carrier portion 52, is rotated about a second rotational axis 102. Because the screw 92 is fixed with respect to the first carrier portion 50, but engages the surface of the second carrier portion 52, the turning of screw 92 forces the second carrier portion 52 to pivot relative to the first carrier portion 50 about the pivot axis 62. In this way, the radiation source 46 is moved up and down with respect to the focal lens 32, depending on whether the screw 92 is rotated clockwise or counterclockwise, thereby providing the user with the ability to vertically orient the source 46 (i.e., along the Y-axis).

Similarly, and as shown in FIG. 9, the third screw 94 is rotated about a third rotational axis 104. The third screw 94 passes through the first carrier portion 50, is secured to the second carrier portion 52, and abuts the third carrier portion 54 (shown more clearly in FIG. 4). Accordingly, because the screw 94 is fixed with respect to the second carrier portion 52, but engages the surface of the third carrier portion 54, the turning of screw 94 forces the third carrier portion 54 to pivot relative to the second carrier portion 52 about the pivot axis 64. In this way, the radiation source 46 is moved back and forth (i.e., right and left) with respect to the focal lens 32, again depending on whether the screw 94 is rotated clockwise or counterclockwise, thereby providing the user with the ability to horizontally orient the source 46. (i.e., along the X-axis).

As a result of this arrangement, the radiation source 46 is easily movable in three orthogonal directions by simply turning the turn screws 90, 92, 94. The screws 90, 92, 94 are finely threaded, such that very precise positioning can be achieved. However, it should be noted that, in certain advantageous embodiments, a fast focus mechanism for the actuators may also be employed, such as for initial setup, to quickly get the radiation source in the appropriate, general position before finely tuning this with the finely threaded screws 90, 92, 94. Such mechanisms can, for example, take the form of a fast thread hex nut that can have its threads temporarily disengaged from the screw by depressing a button on the nut, or a combination of a cam (e.g., Archimedes spiral) and fine screw.

In certain embodiments, the hinges 70, 72, 74 are spring loaded, such that they are each naturally biased. However, in some embodiments, the assembly 42 includes a single tensioning element 82, such as a spring (shown mostly clearly in FIG. 6). The tensioning element 82 has a first end 81 that is connected to the base member 80, and a second end 83 that is connected to the first portion 54 of the carrier 44 such that the element 82 extends at an angle of approximately forty five degrees relative to all three pivot axes 60, 62, 64. In this way, all three hinges 70, 72, 74 simultaneously experience a bias against which motion induced by any individual actuator 90, 92, 94 operates. As a result, the element 82 helps remove any slop in the fit between the hinges and their retaining pins, and allows less expensive, ordinary hinges to be employed as the hinges 70, 72, 74.

Figure 10:
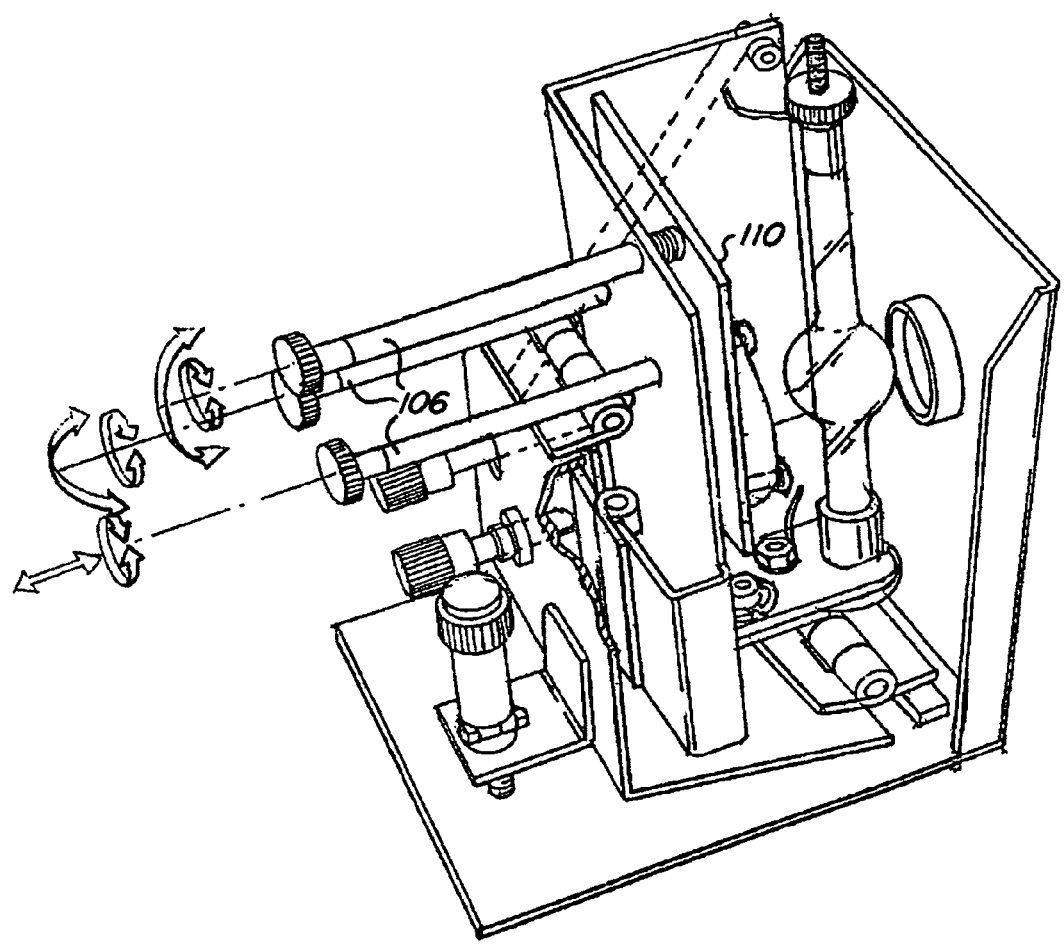
FIG. 10 is a perspective view showing additional detail of the operation of the assembly of FIG. 5.

Returning again to FIG. 4, in certain embodiments, the assembly 42 also includes a mount 110 for an optical element 112, such as a mirror or condenser. The optical element mount 110 is secured to the carrier 44, such as, for example, by at least one adjustable connector 106. This may, for example, comprise a barrel bolt type of assembly, having a threaded bolt that extends outwardly from the mount 100 and a biasing spring 108, such that rotation of the connector 106, as shown in FIG. 10, will cause the mount 110 to move closer to the third carrier portion 54, against the bias of the spring 108, or farther away from the third carrier portion 54, depending on whether the connector is turned clockwise or counter-clockwise. The optical element 112 may, in turn, be secured to the mount 100 by a set of screws 114. In this way, the optical element 112 may be moved relative to the radiation source 46.

Figure 11:
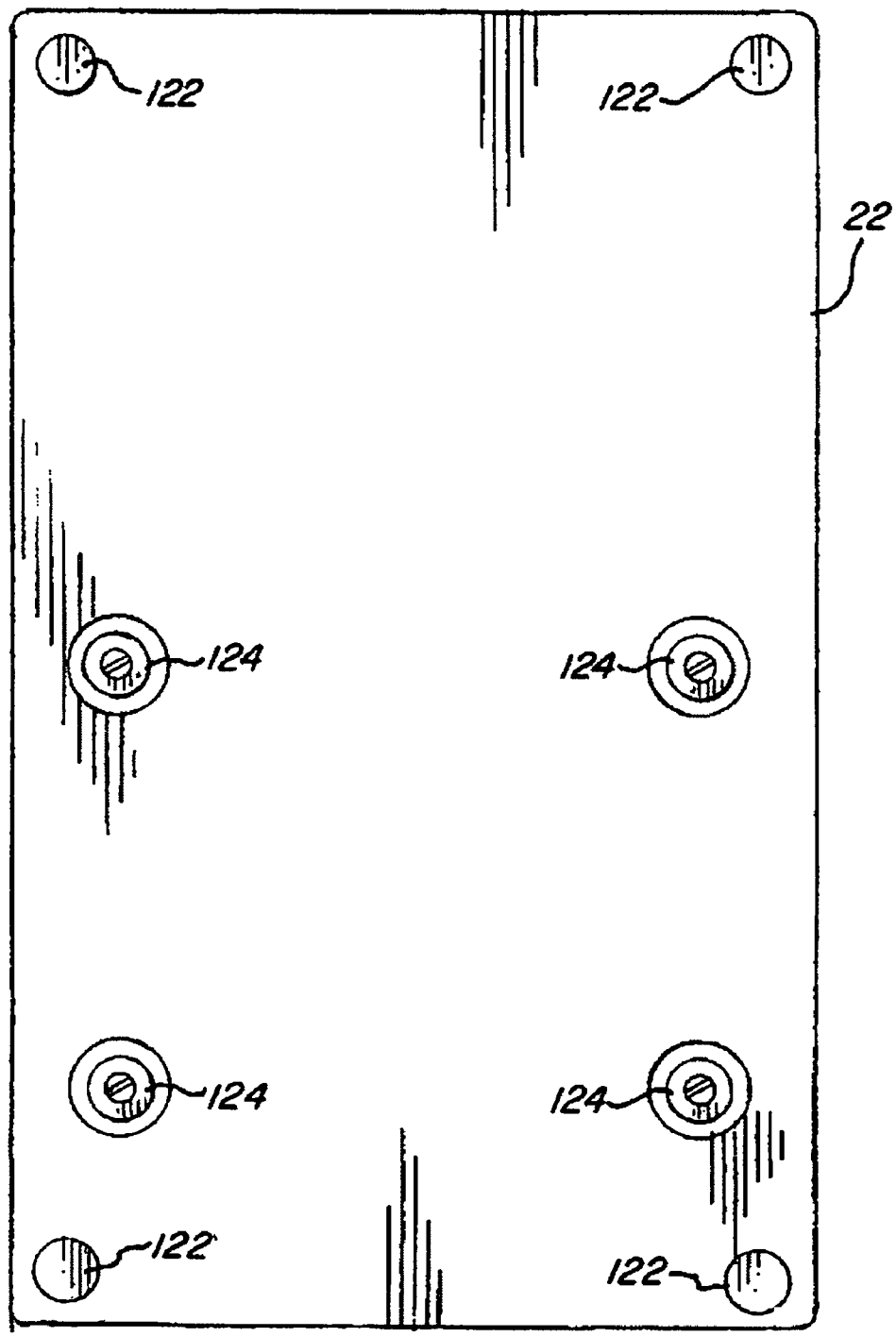
FIG. 11 is a bottom plan view of the system of FIGS. 1-2.

As shown in FIG. 4, in certain advantageous embodiments, a vibration-causing device 120, such as a cooling fan, is mounted to said housing 20. The housing has at least one damping element 122, through which the housing contacts the surface 130 on which the optical system is being used, in order to attenuate the vibrations caused by the cooling fan 120. The at least one damping element may comprise a set of damping feet 122 on the underside of the bottom portion 22 of the housing 20 (also shown in FIG. 11).

In certain advantageous embodiments, the assembly 42 includes its own set of damping feet 124, which support the assembly 42 on the surface 130 at least partially independently of the housing 20. Accordingly, an additional acoustical impedance mismatch results, thereby at least partially insulating the carrier 44 from the vibrations caused by the fan 120. As a result, the precise positioning achieved by the various fine screw controls discussed above is not compromised by any undesired motion caused by such vibrations.

Figure 12:
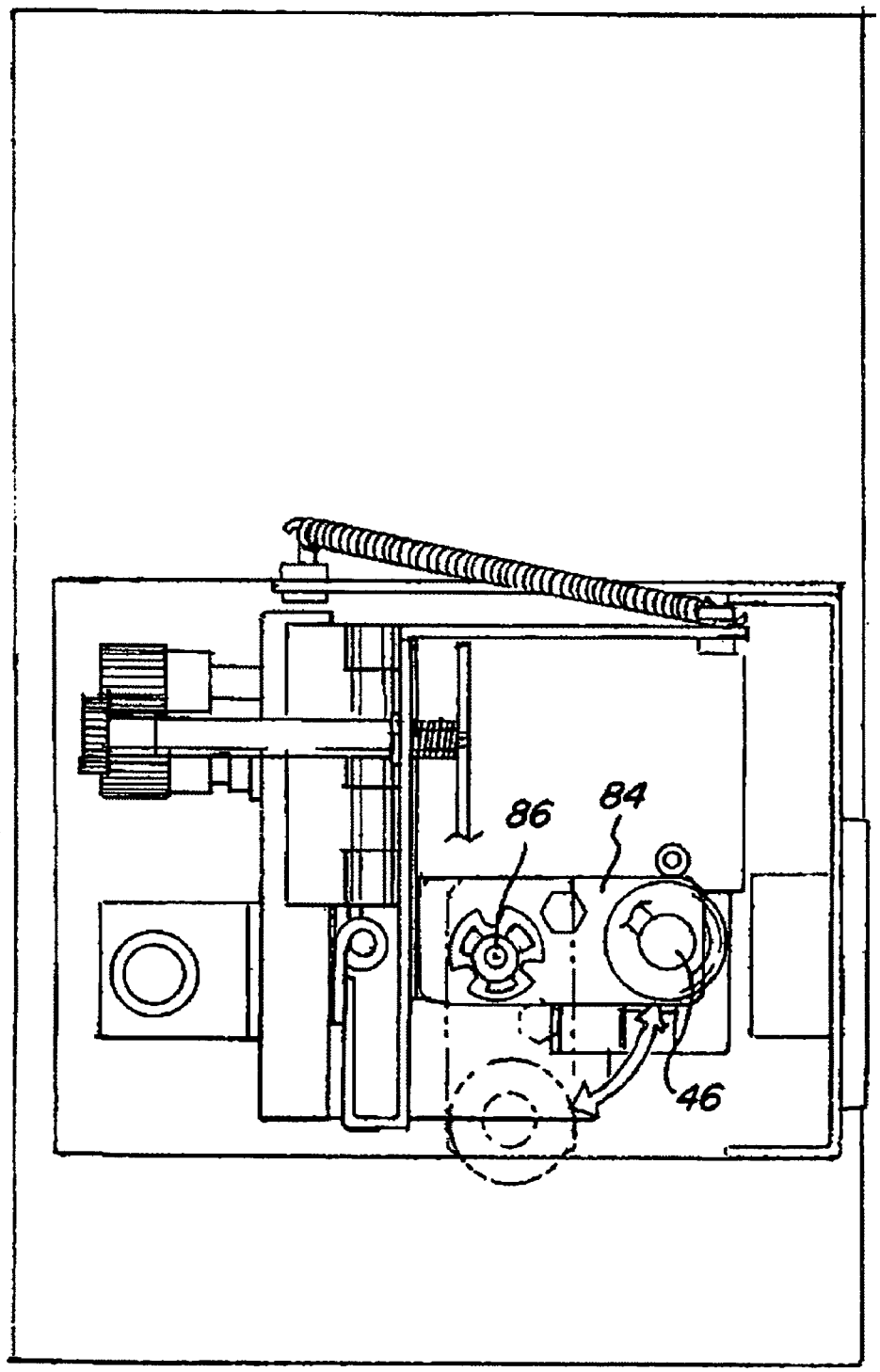
FIG. 12 is an exposed, top plan view of the assembly of FIGS. 1-2.

As illustrated in FIG. 12, in some embodiments, the light source 46 is mounted in a bracket 84, which is, in turn, connected to the carrier 44 via a swivel 86. Accordingly, a user can swing the radiation source 46 outwards to facilitate easier replacement thereof.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. An optical system, comprising:
   an optical device; and
   a carrier for the optical device, said carrier including substantially parallel first and second pivot axes and a third pivot axis substantially orthogonal to the first and second pivot axes for moving said optical device in three substantially orthogonal directions;
   first, second, and third hinges that form the first, second, and third pivot axes; and
   a base member;
   wherein said carrier comprises a first portion connected to said base member by said first hinge, a second portion connected to said first portion by said second hinge; and a third portion connected to said second portion by said third hinge.

2. The optical system of claim 1, wherein said first, second, and third hinges are spring loaded.

3. The optical system of claim 2, further comprising:
a tensioning element having a first end connected to said base member and a second end connected to said carrier such that said tensioning element biases said first, second, and third hinges.

4. The optical system of claim 3, wherein said tensioning element is a spring.

5. The optical system of claim 4, wherein said tensioning element extends approximately forty fives degrees relative to each of said first, second, and third pivot axes.

6. The optical system of claim 1, further comprising:
a first actuator that causes the first portion of said carrier to pivot about said first pivot axis;
a second actuator that causes the second portion of said carrier to pivot about said second pivot axis; and
a third actuator that causes the third portion of said carrier to pivot about said third pivot axis.

7. The optical system of claim 6, wherein said first, second, and third actuators comprise first, second, and third turn screws.

8. The optical system of claim 7, wherein said first turn screw engages said base member, said second turn screw engages the second portion of said carrier, and said third turn screw engages the third portion of said carrier.

9. The optical system of claim 1, wherein said optical device comprises a source of radiation.

10. The optical system of claim 9, wherein said source of radiation comprises a lamp.

11. The optical system of claim 10, wherein said lamp comprises an arc lamp, a halogen lamp, or a deuterium lamp.

12. The optical system claim 9, further comprising an optical element mount secured to said carrier and movable relative to said source of radiation.

13. The optical system of claim 12, further comprising at least one actuator that moves said optical element mount relative to said source of radiation.

14. The optical system of claim 13, wherein said at least one actuator comprises at least three actuators, and wherein the rotation of said at least three actuators moves said optical element mount relative to said carrier.

15. The optical system of claim 12, further comprising an optical element secured to said optical element mount.

16. The optical system of claim 15, wherein said optical element comprises a reflective condenser.

17. The optical system of claim 1, further comprising a bracket to which said optical device is mounted and a swivel by which said bracket is connected to said carrier.

18. An optical system, comprising:
a housing;
an optical device; and
a carrier for the optical device disposed in said housing;
wherein said carrier includes at least one support element for supporting said carrier at least partially independently of said housing to at least partially insulate said carrier from vibrations of said housing; and
wherein said carrier includes substantially parallel first and second pivot axes and a third pivot axis substantially orthogonal to the first and second pivot axes for moving said radiation source in three substantially orthogonal directions.

19. The optical system of claim 18, further comprising a vibration-causing device mounted to said housing.

20. The optical system of claim 19, wherein said vibration-causing device comprises a cooling fan.

21. The optical system of claim 18, wherein said optical device comprises a radiation source.

22. The optical system of claim 18, further comprising first, second, and third hinges that form the first, second, and third pivot axes.

23. The optical system of claim 22, wherein said carrier comprises first, second, and third portions, further comprising first, second, and third turn screws that cause said first, second, and third portions of said carrier to pivot about said first, second, and third pivot axes, respectively.

24. An optical system, comprising:
a housing; and
a carrier for an optical device disposed in said housing;
wherein said carrier includes at least one support element for supporting said carrier at least partially independently of said housing to at least partially insulate said optical device from vibrations of said housing;
said housing includes at least one main damping member for supporting said housing on a surface; and
said at least one support element for supporting said carrier comprises at least one ancillary damping member.

25. The optical system of claim 24, wherein said housing includes at least one hole through which a portion of said carrier passes to support said carrier at least partially independently of said housing.

26. The optical system of claim 24, further comprising a vibration-causing device mounted to said housing.

27. The optical system of claim 26, wherein said vibration-causing device comprises a cooling fan.

28. An optical system, comprising:
an optical device;
a carrier for the optical device, said carrier including substantially parallel first and second pivot axes and a third pivot axis substantially orthogonal to the first and second pivot axes for moving said optical device in three substantially orthogonal directions;
a housing in which said carrier is disposed;
a vibration-causing device mounted to said housing;
at least one support element for supporting said carrier at least partially independently of said housing to at least partially insulate said carrier from vibrations caused by said vibration-causing device.

29. The optical system of claim 28, wherein:
said housing includes at least one main damping member for supporting said housing on a surface; and
said at least one support element for supporting said carrier comprises at least one ancillary damping member.

30. The optical system of claim 28, wherein said vibration-causing device comprises a cooling fan.

31. An optical system, comprising:
an optical device;
a carrier for the optical device, said carrier including substantially parallel first and second pivot axes and a third pivot axis substantially orthogonal to the first and second pivot axes for moving said optical device in three substantially orthogonal directions;
wherein said optical device comprises a source of radiation;
a housing in which said carrier is disposed;
a stationary base member disposed in said housing; and
a focal lens for receiving and transmitting radiation from said source;
wherein said focal lens is fixedly mounted in said stationary base member such that pivoting about said first, second, and third pivot axes moves said source relative to said focal lens.

* * * * *